United States Patent Office 2,813,120
Patented Nov. 12, 1957

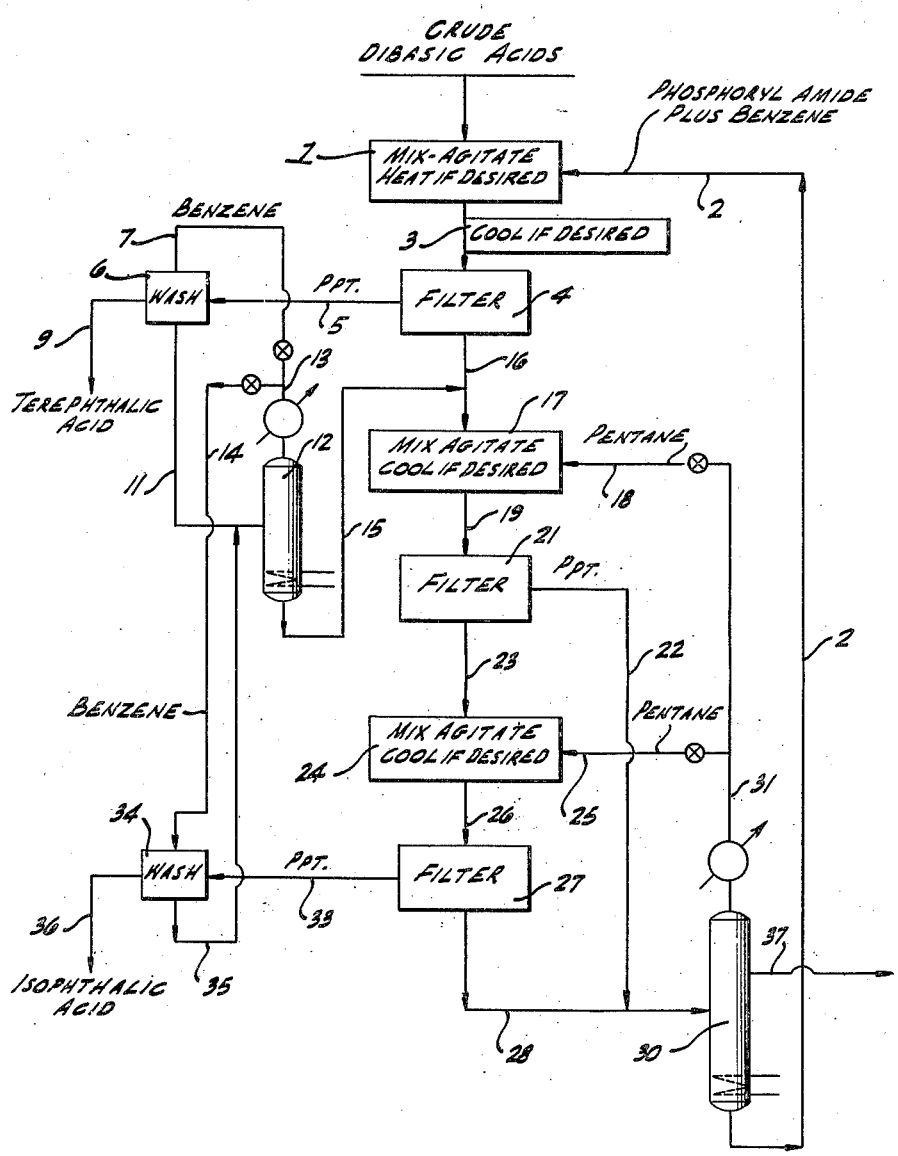

2,813,120

SEPARATION OF TEREPHTHALIC ACID FROM ISOPHTHALIC ACID

Art C. McKinnis, Long Beach, Calif., assignor to Union Oil Company of California, Los Angeles, Calif., a corporation of California Application February 6, 1956, Serial No. 563,726

12 Claims. (Cl. 260—525)

This invention relates to new solvent extraction, or fractional crystallization, processes for separating mixtures of isophthalic acid and terephthalic acid. The salient feature of the process resides in the use of a selective solvent for the isophthalic acid, the solvent consisting essentially of a mixture of a hexa-lower alkyl phosphoryl amide and an aromatic compound. This mixed solvent is employed in the first instance to extract selectively the isophthalic acid from mixtures thereof with terephthalic acid. The undissolved terephthalic acid is then separated by filtration, and the filtrate, containing dissolved isophthalic acid, is treated by adding thereto a paraffinic hydrocarbon to precipitate out the isophthalic acid, and filtering. The filtrate from the isophthalic acid separation is then subjected to distillation to strip out the paraffin hydrocarbon, and the residual phosphoryl amide plus aromatic compound is then recycled to the initial stage of the separation. All of the fractional crystallization or extraction steps may be performed at substantially ambient temperatures if desired, or differential temperatures may be employed.

The aromatic dicarboxylic acids, particularly terephthalic acid, have recently become highly important commercial materials by virtue of their use in the manufacture of certain synthetic polymers such as Dacron. In the past, terephthalic acid has generally been manufactured by the controlled oxidation of pure para-xylene. This process is economically undesirable in that it requires as the starting material substantially pure para-xylene.

Para-xylene is ordinarily obtained as a by-product from certain petroleum fractions, especially gasoline reformate fractions obtained by the reforming of naphthenic petroleum fractions in the presence of certain catalysts such as cobalt molybdate or platinum. From these aromatic fractions may be obtained, as a close-boiling cut, a mixture of meta-, para-, and ortho-xylenes and ethylbenzene, which mixture boils between about 135° C. to 145° C. The ortho-xylene is the highest boiling material, boiling at 144° C. and is hence ordinarily removed by fractional distillation. The ethylbenzene may also be removed by efficient fractional distillation. However, the remaining mixture of meta- and para-xylene is extremely difficult to separate into the pure components. A great variety of methods have been proposed for separating these isomers, but all the presently known methods are difficult and expensive.

This invention obviates the difficulties involved in the xylene separation problem by providing an economical method for separating the oxidation products of the para-xylene-meta-xylene mixture.

The separation of isomeric benzene dicarboxylic acids to obtain the pure meta- and para-isomers is a difficult problem. Phthalic acid, the ortho isomer, is readily separated from the meta- and para-isomers since it alone forms an anhydride. However, the usual physical and chemical methods are not effective for separating isophthalic from terephthalic acid because of their very similar chemical and physical properties. Heretofore, one method for separating these acids has involved forming the alkyl esters of the acids, fractionating the esters, and hydrolyzing the individual ester fractions. Alternatively the isophthalic acid may be selectively esterified without esterifying substantial amounts of terephthalic acid, and the unesterified terephthalic acid separated as such from the esterification mixture. Still another method of separation by esterification involves completely esterifying and then selectively saponifying whereby the terephthalic acid is preferentially hydrolyzed. All of these esterification methods involve an economically undesirable number of steps.

Neither solvent extraction nor fractional crystallization from solvents has been employed to any great extent because of the very limited solubility of both isophthalic acid and terephthalic acid in all common solvents. In my copending joint application, Serial No. 321,049, filed November 17, 1952, now U. S. Patent No. 2,741,633, I have described the use of aqueous alcohols as selective solvents. However, in general the alcoholic solvents exhibit economically feasible solvent capacity only at relatively high temperatures necessitating the use of pressure equipment in some cases. In another copending application, Serial No. 301,304, filed July 28, 1952, now U. S. Patent No. 2,760,974, I have described the use of hexaalkyl phosphoryl amides as selective solvents for separating isophthalic from terephthalic acid. However, the pure phosphoryl amides, while displaying considerable solvent capacity, exhibits a complicating tendency to form hydrogen-bonded adducts with the dibasic acids, which adducts are stable, chemically discrete compounds having melting points above 50° C. The differential solubility of the adducts in the pure solvent, e. g. hexamethyl phosphoryl amide, is apparently less than would be the differential solubility of the acids themselves if no adducts were formed, judging by the larger differential solubilities shown in non-adduct forming solvents such as methanol. For example, at 25° C., isophthalic acid is about 15 times as soluble as terephthalic acid in methanol, but in hexamethyl phosphoryl amide, the isophthalic acid adduct is only about 3.5 times as soluble as the terephthalic acid adduct.

It has now been found that the phosphoryl amide type solvents may be advantageously modified by adding thereto an aromatic solvent modifier, preferably an aromatic hydrocarbon. The addition of such an aromatic component is found to render the terephthalic acid substantially insoluble in the mixed solvent, but the isophthalic acid is still quite soluble. The overall result is that the selectivity of the solvent is considerably improved as compared to the pure phosphoryl amide, and the capacity of the solvent is not appreciably reduced. It would appear that the aromatic component exhibits such great preferential solvency for the phosphoryl amide, as opposed to terephthalic acid, that the adduct of terephthalic acid with the phosphoryl amide is substantially decomposed. On the other hand, the adduct of isophthalic acid and the phosphoryl amide is apparently not decomposed by the addition of the aromatic component, and remains in solution in the mixed solvent. It is found however that upon adding a paraffin hydrocarbon to the solution of isophthalic acid in the phosphoryl amide-aromatic solvent solution, the isophthalic acid adduct is substantially decomposed, precipitating solid isophthalic acid, which may be recovered by filtration.

While the effects of the aromatic and paraffin adjuncts of the solvent cannot be explained with certainty on theoretical grounds, it would seem that the explanation lies in the modification of the capacity of the solvent for the particular dibasic acid, coupled with the differential dissociation constants of the respective acid adducts in the solvent. Employing the designations TPA for terephthalic acid, IPA for isophthalic acid and HMP for hexamethyl phosphoryl amide, the following equilibria will exist in a solution of the two acids in excess HMP:

$$TPA \cdot (HMP)_2 \rightleftharpoons TPA + 2HMP \quad (1)$$

$$IPA \cdot (HMP)_2 \rightleftharpoons IPA + 2HMP \quad (2)$$

The equilibrium for Equation 1 is inherently farther to the right than for Equation 2 because the IPA adduct is more stable than the TPA adduct.

When benzene is added the solubility of TPA is lowered, resulting in precipitation of solid terephthalic acid until a new equilibrium is established such that the dissociated portion of terephthalic acid is soluble. The isophthalic acid, because of its higher solubility, and the lower dissociation constant of its adduct, remains in solution. However, when a paraffin hydrocarbon is added, the solubility of IPA (and of TPA if present) is further reduced, resulting in precipitation of isophthalic acid, and the establishing of a new equilibrium for Equation 2 wherein the solubility of the equilibrium proportion of IPA is not exceeded.

It is possible also that the aromatic solvent adjunct may display some tendency to form weak adducts with the phosphoryl amide. An equilibrium relationship will thus be set up depending upon the two factors, (1) relative adduct forming capacity, and (2) relative solubility of the free acids in the solvent mixture. However, the invention should not be construed as being restricted to any such theoretical explanations.

From the above discussion it is clear that the primary objective of this invention is to provide solvents for the separation of isophthalic and terephthalic acids which exhibit a maximum selectivity and an optimum relationship between selectivity and capacity.

Another object of the invention is to provide moderate temperature ranges for employing the solvent, thereby avoiding the use of pressure equipment.

A further object is to avoid chemical reactions such as esterfication.

All of these general objectives are directed toward obtaining a separation of isophthalic and terephthalic acids by solvent extraction or fractional crystallization whereby each acid may be obtained in maximum purity.

The aromatic component of the solvents employed herein may comprise any aromatic compound which does not form strong adducts with the phosphoryl amide. This excludes aromatic compounds containing strong hydrogen donor groups, e. g. phenols, carboxylic acids, amines, and substituted acetylenes. The over-all requirement for the aromatic compound is that it should exhibit strong selective solvency for the phosphoryl amide, without forming discrete adducts therewith, and the terephthalic acid should be substantially completely insoluble therein. Suitable examples include hydrocarbons, halogenated hydrocarbons, nitro compounds, nitriles, ethers, and the like. The preferred class of compounds includes aromatic hydrocarbons, and chlorinated aromatic hydrocarbons. Alkyl substituted aromatic hydrocarbons may be employed, but the number of alkyl carbon atoms should not be more than about 3 or 4. Suitable examples include benzene, toluene, xylenes, ethylbenzene, cumene, mesitylene, pseudocumene, naphthalene, methylnaphthalenes, tetralin, chlorobenzene, dichlorobenzenes, trichlorobenzenes, chlorotoluenes, chloroxylenes, etc. The preferred class of aromatic compounds may thus be characterized as containing at least one aromatic ring, and not more than about 4 non-aromatic carbon atoms. Mixtures of two or more of any of the above compounds may also be employed.

The amount of the aromatic compound to be employed, relative to the phosphoryl amide, may vary considerably, depending upon the nature of the aromatic compound. Generally, the more aromatic the compound, the more is required, while when employing alkylated aromatics, smaller volumes will be required. When using benzene, between about 0.1 and 20 volumes thereof per volume of phosphoryl amide may be employed; when using xylenes for example, between about 0.05 and 10 volumes thereof per volume of phosphoryl amide may be employed. The halogenated compounds, e. g. chlorobenzene may be employed in substantially the same proportions as benzene, or in most cases somewhat smaller proportions may be employed, e. g. 0.05 to 5.0 volumes thereof per volume of phosphoryl amide. Any of these mixtures are found to increase substantially the selectivity of the solvent for isophthalic acid; and if the proportion added is suitably adjusted, the capacity of the solvent does not suffer appreciably. Preferably, no more of the aromatic compound should be employed than is required to keep out of solution the major portion of the terephthalic acid. The small portion of terephthalic acid which does go into solution may then be recovered in a second stage by cooling, or by addition of more of the aromatic hydrocarbon. This may produce a mixture of isophthalic and terephthalic acid, which may be further purified by any desired method.

In one highly desirable type of operation, sufficient aromatic component is initially employed to dissolve all of the isophthalic acid, leaving undissolved substantially pure terephthalic acid. The undissolved terephthalic acid may constitute about 80–90% of the amount supplied; the remaining 10–20% going into solution along with the isophthalic acid. The pure terephthalic acid is then removed by filtration, and the filtrate is subjected to an intermediate precipitation treatment by adding thereto a small quantity of the paraffin hydrocarbon. This effects substantially complete precipitation of the remaining terephthalic acid plus a small proportion, e. g. 10–15%, of the isophthalic acid. This precipitated mixture may then be recovered by filtration, and recycled to the initial contacting step for further purification. The remaining filtrate is then treated with further quantities of paraffin hydrocarbon to precipitate out substantially pure isophthalic acid.

The paraffin hydrocarbon employed is preferably a low boiling material e. g. pentane or hexane, which may be readily stripped for recycle without imposing uneconomical heat requirement, and minimizing thermal decomposition of the phosphoryl amide during distillation. However from an operative standpoint, substantially any straight or branched-chain paraffin hydrocarbon may be employed including for example propane, butane, isobutane, pentane, isopentanes, hexanes, isohexanes, heptanes, octanes, nonanes, decanes, undecanes, dodecanes, etc., and mixtures thereof. The proportion of such paraffin hydrocarbons to be employed is inter-related with the amount of aromatic compound present, and the overall concentration of isophthalic acid in the solution. The appropriate amounts may be readily determined with any given mixture, by simply continuing the addition until precipitation substantially ceases. The proportion to be added may be reduced by cooling the mixture if desired.

A typical filtrate from the terephthalic acid separation stage may consist for example of about 50 volumetric parts of benzene and 50 volumetric parts of phosphoryl amide, in which is dissolved about 15 gravimetric parts of isophthalic acid. The isophthalic acid in such a filtrate may be substantially completely precipitated by adding thereto about 40–100 parts by volume of pentane, or other paraffin hydrocarbon. However, any other effective proportions may be employed.

The phosphoryl amides employed herein correspond to the general formula:

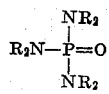

wherein R is a lower alkyl group, e. g. methyl, ethyl, propyl, isopropyl, butyl, amyl, hexyl, or mixtures thereof. The methyl and ethyl compounds are preferred. The amount of phosphoryl amide to be employed should be at least about 2 moles per mole of isophthalic acid present in the crude mixture, in order that sufficient of the amide will be present to keep the isophthalic acid in solution during the separation of terephthalic acid. However, amounts up to about 40 moles per mole of isophthalic acid may be employed, requiring the use of larger amounts of aromatic component, and the paraffin component. Generally, from the standpoint of minimizing heat requirements and solvent handling expenses, it is preferred to use between about 2 and 10 moles of phosphoryl amide per mole of isophthalic acid.

The operation of the process may perhaps be more readily understood with reference to the accompanying drawing, which is a flowsheet illustrating one particular modification. However, the invention should not be construed as restricted to the details of this modification.

The crude mixture of dibasic acids is agitated in a first mixing zone 1 with recycle solvent admitted through recycle line 2. The solvent may be at substantially room temperature, or it may be admitted hot, as recovered from the bottom of distillation column 30, described hereinafter. In mixing zone 1, the solid acids and liquid solvent are agitated for several minutes until substantially all the isophthalic acid is dissolved. By employing elevated temperatures, the volume of solvent employed is minimized; however this advantage should be balanced against the advantage of using larger amounts of solvent and conducting the process at ambient temperatures.

The slurry from mixing zone 1 is then transferred via line 3 to a filter 4. Before filtration, the slurry may if desired be cooled to effect further precipitation of terephthalic acid. The solid precipitate from filter 4 is withdrawn through line 5 and transferred to a wash vessel 6, wherein residual solvent plus isophthalic acid is removed therefrom by washing with, e. g. benzene, from line 7. Substantialy pure terephthalic acid (98–100% pure) is withdrawn through line 9, while the wash liquor is transferred via line 11 to a stripping column 12 wherein the benzene is recovered overhead through line 13 for re-use in wash vessel 7, or via line 14 for use in wash vessel 34, described hereinafter. The bottoms from column 12 consists essentially of the high-boiling phosphoryl amide plus small amounts of the adduct thereof with isophthalic acid. This liquid mixture is transferred via line 15 to line 16 weherin it mingles with filtrate from filter 4.

The combined slurry from filter 4 and stripping residue from line 15 is then admitted to the second mixing zone 17 to which a small amount of pentane is introduced through line 18. The amount of pentane to be added at this stage depends upon the particular process requirements. In the preferred modification only sufficient is added to effect precipitation of substantially all the remaining terephthalic acid, plus minor proportions of the isophthalic acid. The temperature in mixing stage 17 may be substantially ambient, or the mixture may be cooled further to lower the solubilities. It should be understood that in any of the mixing zones, the operative temperatures include the entire range wherein the solvent is liquid. Such temperatures may range between about −10° C. and 150° C. When using the higher temperatures, pressure vessels will be required if a low-boiling aromatic compound such as benzene is employed.

The slurry resulting from mixing zone 17 is then transferred via line 19 to a second filter 21. The precipitate from filter 21 is taken off through line 22 and transferred to distillation column 30 for ultimate recycle to the first mixing zone, and further resolution thereof. By transferring the precipitate through distillation column 30, the precipitate is effectively stripped of any pentane it may contain.

The filtrate from filter 21 now consists essentially of phosphoryl amide, benzene, dissolved isophthalic acid adduct, and a small proportion of pentane. This mixture is then transferred via line 23 to a third mixing stage 24, to which additional pentane is admitted through line 25. Sufficient pentane is added at this point to precipitate at least the major portion of isophthalic acid contained in the filtrate from line 23. The purity of this acid may ordinarily range between about 90% and 98%. The residence time in mixing zone 24 is ordinarily from about 5 to 30 minutes, and the temperature may, if desired, be further reduced to enhance precipitation. The resulting slurry is then transferred via line 26 to a final filter 27. The filtrate from filter 27 is transferred via line 28 to distillation column 30 in admixture with the mixed precipitate from filter 21. In distillation column 30 the pentane is taken overhead into line 31 and recycled to mixing zones 17 and 24 as previously described. The bottoms from distillation column 30 consists essentially of phosphoryl amide, benzene, and small amounts of mixed dibasic acids. The composition of these acids may preferably be approximately of the same composition as the original crude dibasic acids. This combined mixture is then recycled via line 2 to the initial mixing zone 1.

The precipitate from filter 27 is transferred via line 33 to a wash vessel 34 wherein traces of adhering phosphoryl amide are removed by washing with benzene from line 14. The amount of phosphoryl amide on the solid acid is so small relative to the quantity of benzene used for washing that substantially none of the acid is dissolved. The spent wash liquor from washing vessel 34 is returned via line 35 to distillation column 12, where the benzene is recovered for recycle. Substantially pure isophthalic acid is taken off through line 36.

By the above procedure, it is possible to maintain a continuous operation wherein 99–100% pure terephthalic acid is recovered, along with 90–98% pure isophthalic acid. According to one modification of the procedure, distillation column 30 may be operated so as to remove a side-cut through line 37 which will consist essentially of the benzene. The bottoms removed through line 2 will then consist substantially only of the phosphoryl amide component of the solvent. The pure phosphoryl amide may then be initially contacted with the crude acids, thereby effecting a complete solution of both acids. To this mixture may then be added the benzene side-cut to precipitate the terephthalic acid, as previously described in mixing stage 1. This procedure has the advantage of providing somewhat purer terephthalic acid as a result of recrystallizing the same from solution. The solvent extraction method will produce substantially the same purity of acid, but may require a longer period of mixing and agitation in vessel 1 in order to establish the ultimate equilibrium.

Other operative details of the process will be more apparent from the following examples, which are likewise to be construed as illustrative only and not limiting.

*Example I*

About 166 grams of a mixture consisting of 50% by weight isophthalic acid and 50% terephthalic acid is agitated and mixed with about 180 grams of hexamethyl phosphoryl amide and about 400 ml. of benzene. Agitation is continued at room temperature for about 40 minutes, and the resulting slurry is then filtered. The filter cake is washed with two 100 ml. portions of benzene, and dried in an air stream. This dry solid material is found to comprise 96–98% pure terephthalic acid in good yields.

The filtrate is then mixed and agitated with 200 ml.

of pentane. A further precipitation of solid material is observed, and after a few minutes, the mixture is again filtered and washed with benzene to remove adhering phosphoryl amide. The solid material is found to consist of about 92% pure isophthalic acid.

*Example II*

By substituting 250 ml. of chlorobenzene for the benzene employed in Example I, and employing chlorobenzene washes throughout, substantially the same separation is obtained.

*Example III*

About 166 grams of the 50/50 mixture of dibasic acids employed in Example I is mixed and agitated with about 400 grams of hexamethyl phosphoryl amide and 100 ml. of benzene. After thorough agitation for several minutes at 50° C., the mixture is subjected to filtration. The precipitate, after washing with benzene, is found to consist of 99–100% pure terephthalic acid.

The filtrate is then cooled to about 30° C., and 15 ml. of petroleum ether is added thereto. The mixture is then agitated for several minutes and again filtered. The washed and dried precipitate is found to comprise both terephthalic acid and isophthalic acid in substantial proportions. The second filtrate is then treated by the addition of 100 ml. of petroleum ether, whereby further quantities of solid material precipitate. The solid material is removed by filtration, and after washing and drying, is found to consist of isophthalic acid of 98–99% purity.

The final filtrate is found by analysis to contain only about 5–10% of the original dibasic acids.

This example shows that by employing a three-stage precipitation, each of the acids may be separated in substantially pure condition.

*Example IV*

About 17 grams of the 50/50 mixture of isophthalic acid and terephthalic acid is dissolved in about 50 grams of pure hexamethyl phosphoryl amide by heating the mixture gently to about 80° C. To the resulting solution is then added 50 ml. of benzene, and the mixture is allowed to cool to about 30° C. with agitation. The resulting slurry is then filtered, and the precipitate is found to consist of substantially 100% pure terephthalic acid. The filtrate, containing substantially all of the isophthalic acid, may then be treated for its recovery as described in any of the foregoing examples. The final filtrate, after separation of the isophthalic acid, is subjected to distillation to recover overhead the isopentane employed, and then as a second overhead, substantially all of the benzene is recovered. The final residue from the distillation consists of hexamethyl phosphoryl amide containing small amounts of dissolved acids, and is suitable for recycle as such.

Manifestly, the details of the above examples may be varied considerably as to procedural details, specific solvents, temperatures, proportions of solvents, etc. Any such variations which achieve substantially the same objectives are contemplated herein. The true scope of the invention is intended to be embraced within the scope of the following claim.

I claim:

1. A method for recovering terephthalic acid from a mixture thereof with isophthalic acid, which comprises contacting said mixture with a selective solvent for said isophthalic acid at a temperature at which said solvent is liquid, said solvent consisting essentially of a mixture of (1) a hexa-lower alkyl phosphoryl amide, and (2) an aromatic compound which (a) is free from active hydrogen atoms capable of forming hydrogen bonds and (b) contains not more than four non-aromatic carbon atoms, the proportion of said phosphoryl amide being at least sufficient to provide about two moles thereof per mole of isophthalic acid in said mixture, and recovering solid terephthalic acid from said contacting.

2. A process as defined in claim 1 wherein said aromatic compound is an aromatic hydrocarbon containing a single benzene ring.

3. A process as defined in claim 1 wherein said aromatic compound is benzene.

4. A process as defined in claim 1 wherein said hexa-lower alkyl phosphoryl amide is hexamethyl phosphoryl amide.

5. A method for recovering terephthalic acid from a mixture thereof with isophthalic acid, which comprises contacting said mixture with a selective solvent for said isophathalic acid at a temperature at which said solvent is liquid, said solvent consisting essentially of a mixture of (1) a hexa-lower alkyl phosphoryl amide, and (2) an aromatic compound which (a) is free from active hydrogen atoms capable of forming hydrogen bonds and (b) contains not more than four non-aromatic carbon atoms, the proportion of said phosphoryl amide being at least sufficient to provide about two moles thereof per mole of isophthalic acid in said mixture, separating solid terephthalic acid from the resulting mixture, adding to the liquid filtrate sufficient of a paraffin hydrocarbon to precipitate isophthalic acid, and separating said precipitated isophthalic acid from the mixture.

6. A process as defined in claim 5 wherein said paraffin hydrocarbon has a boiling point substantially lower than said aromatic compound.

7. A continuous process as defined in claim 6 wherein said paraffin hydrocarbon is distilled from the filtrate resulting from said isophthalic acid separation and is recycled to said isophthalic acid precipitation step, and the bottoms from said distillation comprising phosphoryl amide plus aromatic compound is recycled to said initial contacting step.

8. A continuous method for recovering terephthalic acid and isophthalic acid from a mixture thereof, which comprises contacting said mixture with a selective solvent for said isophthalic acid at a temperature at which said solvent is liquid, said solvent consisting essentially of a mixture of (1) a hexa-lower alkyl phosphoryl amide, with (2) an aromatic compound which (a) is free from active hydrogen atoms capable of forming hydrogen bonds and (b) contains not more than four non-aromatic carbon atoms, the proportion of said phosphoryl amide being at least sufficient to provide about two moles thereof per mole of isophthalic acid in said mixture, separating solid terephthalic acid from the resulting mixture, adding to the liquid filtrate sufficient of a paraffin hydrocarbon to precipitate any remaining terephthalic acid but insufficient to precipitate more than a portion of the isophthalic acid, separating the precipitated acid mixture and recycling the same to said initial contacting step, adding to the filtrate from said last precipitation a further portion of paraffin hydrocarbon to precipitate substantially all of the remaining isophthalic acid, separating said precipitated isophthalic acid, subjecting the filtrate from said last precipitation to distillation to recover said paraffin hydrocarbon and recycling the same to said mixture-precipitating step and to said isophthalic acid precipitating step, and recycling the bottoms from said distillation, comprising phosphoryl amide plus aromatic compound, to said initial contacting step.

9. A process as defined in claim 8 wherein said aromatic compound is benzene, and said paraffin hydrocarbon is essentially pentane.

10. A method for recovering terephthalic acid from a mixture of terephthalic acid and isophthalic acid, which comprises contacting said mixture with (1) a hexa-lower alkyl phosphoryl amide, and (2) an aromatic compound which (a) is free from active hydrogen atoms capable of forming hydrogen bonds and (b) contains not more than four non-aromatic carbon atoms, the proportion of said phosphoryl amide being at least sufficient to provide about two moles thereof per mole of isophthalic acid in said mixture, at least a part of said contacting being conducted in the presence of both of said solvent components at a temperature at which both a solid and a liquid phase are present, thereby selectively dissolving isophthalic acid and recovering solid terephthalic acid from said contacting.

11. A process as defined in claim 10 wherein said contacting with said components (1) and (2) occurs simultaneously, whereby said isophthalic acid is substantially dissolved, while the terephthalic acid remains substantially undissolved.

12. A process as defined in claim 10 wherein said mixture is first contacted with sufficient of said phosphoryl amide to substantially completely dissolve both of said acids, and the resulting solution is then mixed with said aromatic compound to effect precipitation of solid terephthalic acid.

References Cited in the file of this patent
UNITED STATES PATENTS 2,760,974  McKinnis _____ Aug. 28, 1956